June 19, 1945. W. W. ROACH 2,378,792
CATALYST CHAMBER CONSTRUCTION
Filed April 12, 1943
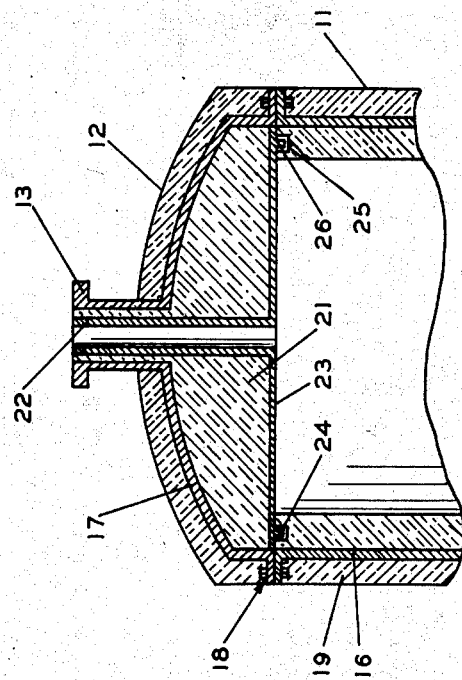
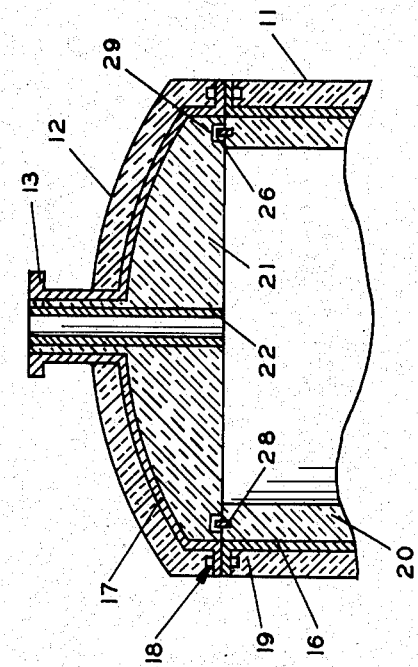
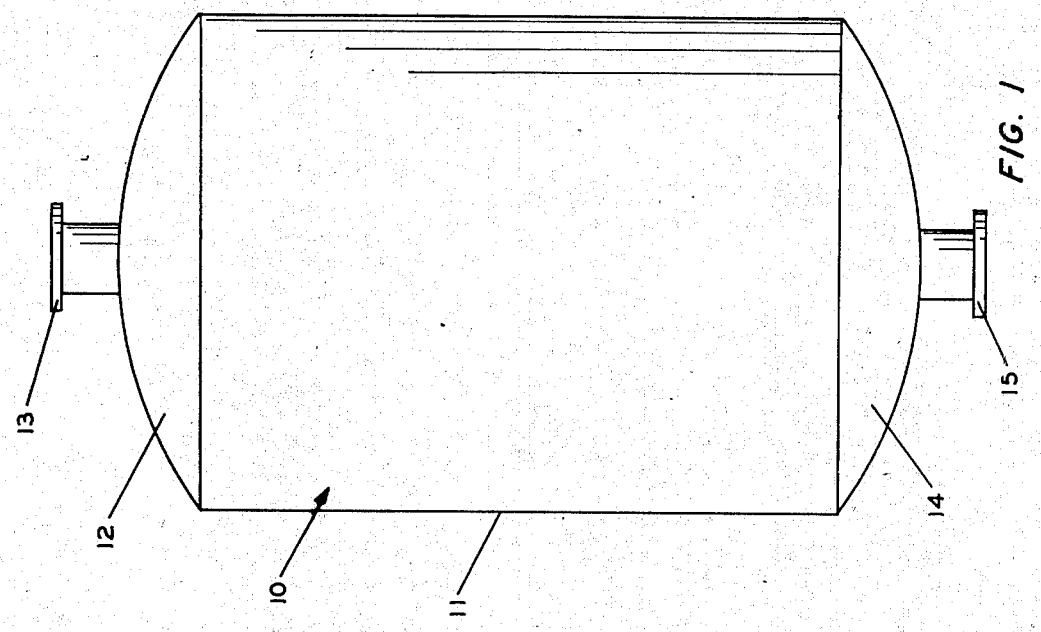
INVENTOR.
W. W. ROACH
BY Hudson, Young & Ginger
ATTORNEYS.

Patented June 19, 1945

2,378,792

UNITED STATES PATENT OFFICE 2,378,792

CATALYST CHAMBER CONSTRUCTION

Wendell W. Roach, Kansas City, Mo., assignor to Phillips Petroleum Company, a corporation of Delaware Application April 12, 1943, Serial No. 482,809

4 Claims. (Cl. 23—288)

This invention relates to improvements in the construction of catalyst chambers of the class employed in carrying out hydrocarbon conversions in the presence of solid catalyst material and is particularly concerned with improvements in the construction of such chambers whereby an effective fluid seal may be properly obtained between joints in the chamber, as will be more fully set forth further along.

In the course of hydrocarbon conversions over solid contact catalysts, the catalysts ordinarily undergo progressive deactivation or degeneration, due to the accumulation of carbonaceous residue deposits thereon, making it imperative to reactivate the catalyst at regular intervals. It is customary to reactivate the degenerated catalyst by burning off the carbonaceous deposits. By virtue of the exothermic heat of combustion developed in the course of reactivation, the catalyst mass and the chamber may be raised to temperatures within the range of about 1000° to 1500° F. These elevated temperatures are attained in the presence of free oxygen containing fluids, such as air; and, as a result thereof, ordinary metals, when directly subjected to such temperatures, deteriorate rather quickly. Moreover, high temperatures are required during the conversion period, and since the conversion is often endothermic, it is desirable to minimize heat losses in order to maintain an efficient rate of conversion. For these reasons it has become desirable and convenient to insulate the interior of the usual metal catalyst chamber with an inner lining or sheath of insulating material that is preferably of the refractory type. This inner lining protects the metal chamber from the detrimental effects of high temperatures, and in some cases enables the use of carbon steel instead of more expensive special alloy metals. Furthermore, the use of such a lining greatly reduces heat losses that would otherwise occur in the conversion process. Suitable heat resistant materials are preferably applied to the interior walls of the chamber by casting the same therein.

In the casting of refractory chamber linings care must be taken to obtain vapor-tight joints in order that the hot gases and/or vapors within the chamber may not pass through the joints and reach the metal shell. When this occurs, the linings may become detached from the shell and the hot fluids may channel between the detached lining and the inner surface of the shell, thereby bypassing the catalyst bed. Such an eventuality results in unsatisfactory operation, heat losses through the chamber and incomplete conversion of the process material. Vapor-tight joints are extremely difficult to form because of the tendency of insulating materials such as refractory cements to shrink on setting after being cast in the form of a plastic mass. This results in the formation of free spaces between separate castings through which fluids may pass.

My invention pertains to the fabrication of a catalyst chamber having a tubular wall which is internally insulated, as indicated above, and a removable cover which is also insulated on its inner surface. The practice of my invention provides an effective seal between the insulation in the tubular shell and the insulation carried by the removable cover.

An important object of this invention is to provide a catalyst chamber of improved construction that is adapted to perform its intended functions in a dependable and effective manner.

It is another important object of this invention to provide a substantially fluid-tight seal between the main body portion and the cover of a catalyst chamber of the character indicated above.

These, as well as other objects and advantages, will be readily apparent to persons skilled in the art from a perusal of the following detailed description and the annexed drawing, which respectively describe and illustrate preferred embodiments of the invention, and wherein Figure 1 is an elevation view of the catalyst chamber of this invention;

Figure 2 is a central vertical cross section view through the upper portion of Figure 1; and Figure 3 is generally similar to Figure 2 and illustrates a modified form of the invention.

Referring to the drawing, wherein like reference characters denote like parts in the several views, the catalyst chamber of the instant invention is generally indicated by reference numeral 10 and includes a substantially vertical tubular side wall 11, a top wall 12 having a fluid inlet member 13, and a bottom wall 14 having a fluid outlet 15. It is to be understood that member 15 may serve as the fluid inlet and member 13 as the fluid outlet, if desired. Side wall 11 includes a metal tubular member 16 that is preferably circular in cross section and that is fabricated from sheet or plate metal of requisite thickness and composition to withstand the temperature and pressure conditions to which it is subjected during normal operation; and a liner or sheath of refractory insulating material 20. Both the top wall 12 and the bottom wall 14 include a member 17 that is the same as or of similar composition to element 16, and an inner liner of insulation 21 that is preferably the same as said liner 20. An outer sheath of insulating material 19 that may be of the asbestos type forms a part of each of the walls. It will be observed from an inspection of the drawing that the top wall is removably attached to the upper end of the side wall by means of the flange and bolt arrangement 18. A tubular liner 22 establishes communication between inlet 13 and the interior of the chamber.

Turning now to Figure 2, it will be noted that the lower surface of insulating sheath 21 is provided with a metal liner 23 which carries a ring 24 that projects downwardly therefrom. The upper surface of insulating sheath 20 is formed with an annular groove 25 to receive said ring 24. Suitable plastic material 26 is contained in any portions of groove 25 that is not occupied by flange 24.

The modification of the invention illustrated in Figure 3 contemplates the positioning of a metal ring 28 in the upper end of insulating material 20 at the time said insulating material is placed in the side wall 11. Liner 21 of cover 12 is provided with a groove 29 that is adapted to receive the upper portion of ring 28. Any portions of groove 29 that may not be occupied by ring 28 is filled with a sealing material 26 such as refractory insulation.

In the construction of either of the illustrated embodiments of my invention the bottom wall may be made integral with the lower end of the side wall or may be removable and of the same construction as the top wall.

From the foregoing it is believed that the construction and advantages of my present invention will be readily understood by persons skilled in the art. It is to be borne in mind, however, that various changes in the apparatus may be resorted to without departing from the spirit of the invention as defined by the appended claims.

I claim:

1. In apparatus for treating fluid material in the presence of solid catalyst material, the combination comprising a container including a tubular side wall, a bottom wall and a top wall; a first liner comprising insulating material on the inner surface of the side wall and extending substantially to the upper end thereof; a second liner comprising insulating material on the inner surface of the top wall and disposed in abutting relation to the upper end of the first liner; and a third liner comprising an annular member carried by one of the liners and projecting into the upper end of the first liner intermediate the inner and outer surfaces thereof to prevent fluid from flowing from the interior of the container, between the first and second liners, and thence to the inner surface of the side wall.

2. In apparatus for treating fluid material in the presence of solid catalyst material, the combination comprising a container including a substantially cylindrical side wall, a bottom wall and a top wall; a first liner of insulating material on the inner surface of the side wall and extending substantially to the upper end thereof; a second liner of insulating material on the inner surface of the top wall; a third liner interposed between and substantially coextensive and in contact with the upper end surface of the first liner and the lower surface of the second liner; and an annular ring integral with the third liner and projecting into the upper end of the first liner intermediate the inner and outer surfaces thereof to prevent fluid from flowing from the interior of the container, between the first and third liners, and thence to the inner surface of the side wall.

3. In apparatus for treating fluid material in the presence of solid catalyst material, the combination comprising a container including a substantially cylindrical side wall, a bottom wall and a top wall; a substantially cylindrical first liner of insulating material on the inner surface of the side wall and extending substantially to the upper end thereof; a second liner of insulating material on the inner surface of the top wall, the lower surface of the second abutting the upper end surface of the first liner; and an annular ring extending into both liners across the abutting surfaces and intermediate the inner and outer surfaces of the first liner for preventing fluid from flowing from the interior of the container, between the liners, and thence to the inner surface of the side wall.

4. In apparatus for treating fluid material in the presence of solid catalyst material, the combination comprising a container including a substantially cylindrical side wall, a bottom wall and a top wall; a substantially cylindrical first liner of insulating material on the inner surface of the side wall and extending substantially to the upper end thereof; a second liner of insulating material on the inner surface of the top wall, the lower surface of the second abutting the upper end surface of the first liner; an annular groove in the abutting surface of the second liner; and an annular ring imbedded in the upper end of the first liner intermediate the inner and outer surfaces thereof, said ring projecting above the first liner and registering with the groove in the second liner, thereby preventing fluid from flowing from the interior of the container, between the liners, and thence to the inner surface of the side wall.

WENDELL W. ROACH.